United States Patent Office 3,297,597
Patented Jan. 10, 1967

3,297,597
PRODUCTION OF RIGID POLYURETHANE FOAM
Gayle D. Edwards, Port Arthur, Doris M. Rice, Austin, and Robert L. Soulen, Georgetown, Tex., assignors to Jefferson Chemical Company Inc., Houston, Tex., a corporation of Delaware
No Drawing. Filed May 23, 1966, Ser. No. 551,892
14 Claims. (Cl. 260—2.5)

This application is a continuation-in-part of copending application Serial Nos. 458,488, filed May 24, 1965 and 504,089, filed October 23, 1965, now abandoned.

Application Serial Nos. 458,488 and 504,089 are continuations-in-part of application Serial No. 288,474, filed June 17, 1963.

This invention relates to the production of polyurethane foam. More particularly, this invention relates to improved rigid polyurethane foam prepared from a new class of polyols.

It is known to prepare rigid polyurethane foam by the reaction of a polyisocyanate with a hydroxyl-terminated polyester or poly(oxylakylene) ether having a hydroxyl number within the range of from about 350 to about 900. However, no ideal polyol has been found and, for various reasons, polyurethane foams prepared to date have not been entirely satisfactory.

For example, the resistance of rigid polyurethane foams to conditions of high temperature and high humidity has left much to be desired. As a further example, for many polyurethane applications it is necessary to have a foam which is either self-extinguishing or substantially noncombustible and to provide these properties it is necessary to add extraneous fire retardants such as organic phosphorus compounds. Unfortunately, extraneous fire retardant compounds are normally required in an amount such that the final qualities of the polyurethane foam are adversely affected.

Still further, the production of a satisfactory urethane foam requires that the relative rates of the various reactions that occur be properly balanced. This balance is normally obtained by careful selection of a catalyst system. The catalyst usually consists of a tertiary amine used alone or, when necessary, mixed with organic tin compounds in a manner well known to those skilled in the art. The tertiary amines so employed will normally impart an objectionable amine odor to the final foam product.

It has now been discovered that many of the above-described disadvantages of urethane foams can be overcome by the use of novel nitrogen-containing polyols having a sufficient catalytic activity such that no extraneous catalyst is necessary for the production of rigid foam. Quite surprisingly, the rigid polyurethane foam prepared from polyols of the present invention is characterized by greater ease of fire retardancy and good dimensional strength when extraneous fire retardants are employed. In addition, the amine odor often associated with rigid urethane foams is not present in the instant foams.

The polyol that is employed in accordance with the present invention is obtained by the addition at a temperature of about 30° to about 200° C. of an alkylene oxide to a Mannich condensation product of a phenolic compound with formaldehyde and an alkanolamine. These polyols have hydroxyl numbers of from about 250 to about 900 and a nitrogen content of from about 1 to about 15 wt. percent, said nitrogen being present in the molecule as tertiary nitrogen in the form of from one to three N-disubstituted aminomethyl groups attached to an aromatic nucleus to which is also attached at least one hydroxyalkoxy group derived from an alkylene oxide selected from the group consisting of ethylene oxide, propylene oxide, styrene oxide, 1,2-butylene oxide and glycidol. At least one of the substituents on the nitrogen atom of the aminomethyl group will contain from one to two primary and secondary hydroxyl groups.

The Mannich reaction is a well-known reaction wherein an active hydrogen compound is reacted with formaldehyde and a primary or secondary amine to provide a substituted aminomethyl derivative of the active hydrogen starting material. The Mannich derivative to be employed as a starting material for the preparation of the polyols of the present invention is prepared in accordance with the customary procedure using a phenolic compound, as described hereinbelow, as the active hydrogen compound. The ortho and para positions of these phenolic compounds are sufficiently reactive to enter into the Mannich reaction.

For example, the Mannich reaction is conducted by pre-mixing the phenolic compound with a desired amount of the alkanolamine and then slowly adding formaldehyde to the mixture at a temperature below the temperature of Novolak formation (a temperature that will vary with the phenolic compound employed and is a temperature of less than about 35° C. when phenol itself is employed). At the end of the formaldehyde addition, the reaction mixture is slowly heated with agitation to a temperature of at least about 50° C., such as a temperature within the range of about 80° to about 150° C. for a period of time sufficient to reduce the formaldehyde content to at least about 1 wt. percent. This will require normally from about two to about four hours reaction time at the elevated temperature.

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without attempting to isolate the individual components thereof. In fact, in accordance with the preferred embodiment of the present invention, the entire crude Mannich reaction product is used as such, and when this is done positive steps should be taken in order to provide the reaction product containing less than about 1 wt. percent of free formaldehyde.

The phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl and hydroxyalkyl. The phenolic compound is further characterized by a molecular weight within the range of from about 94 to about 500. Examples of acceptable phenolic compounds include o-, m-, or p-cresols, ethylphenol, nonylphenol, p-phenylphenol, 2,2-bis(4-hydroxyphenyl)propane, β-naphthol, β-hydroxyanthracene, p-chlorophenol, o-bromophenol, 2,6-dichlorophenol, p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4-bromophenol, 2-(2-hydroxypropyl)phenol, 2-(4-hydroxphenyl)ethanol, 2-carbethoxyphenol and 4-chloromethylphenol.

The alkanolamine to be reacted with the phenolic compound and formaldehyde in accordance with the present invention is an alkanolamine selected from the group consisting of alkanolamines having the formulae:

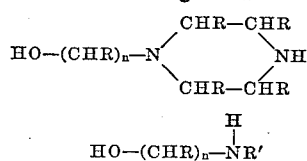

wherein R is selected from the group consisting of hydrogen and $C_1$–$C_4$ alkyl, R' is selected from the group consisting of hydrogen, $C_1$–$C_4$ alkyl and —$(CHR)_n$—OH, and $n$ is a positive integer having a value of two to five.

Examples of suitable alkanolamines that may be used are monoethanolamine, diethanolamine, isopropanolamine, bis(2-hydroxypropyl)amine, hydroxyethylmethylamine, N-hydroxyethylpiperazine, N-hydroxybutylamine, N-hydroxyethyl-2,5-dimethylpiperazine, etc.

Formaldehyde may be employed in the Mannich reaction in any of its conventional forms, such as an aqueous formalin solution, an "inhibited" methanol solution, paraformaldehyde or trioxane.

The characteristics of the Mannich product and consequently the characteristics of the alkylene oxide adduct of the Mannich product may be varied over wide limits by proper choice of the phenolic compound and alkanolamine employed and by varying the molar ratios of the reactants. For example, if phenol, diethanolamine and formaldehyde are employed in a molar ratio of 1:3:3, the predominant product will have seven hydroxyl groups attached to a single molecule. If the molar ratio of these same reactants is changed to 1:2:2, a pentol will be obtained as the predominant product. Similarly, when the molar ratio is 1:1:1, a triol is the predominant product.

If an excess of formaldehyde is used in the preparation of the triol or pentol, the Mannich reaction becomes complex due to the secondary condensation of phenol and formaldehyde. This is the well-known Novolak reaction which leads to polymethylene derivatives of phenol. For example, when phenol, diethanolamine and formaldehyde are reacted in the molar ratio of 1:1:2, the normal Mannich reaction occurs in one of the three active phenol positions. This leaves two available active positions on the phenol nucleus to undergo condensation with the excess formaldehyde. The presence of the amine groups affords sufficient base catalysis to promote the phenol-formaldehyde condensation leading to a complex reaction product.

In accordance with the present invention, the Mannich reaction product is reacted with an alkylene oxide to provide the final polyol. The nitrogen present in the Mannich condensate has sufficient catalytic activity to promote the reaction of one mol of the alkylene oxide with each free amino hydrogen atom and phenolic and primary hydroxyl group and no additional catalyst is needed. The alkoxylation is conducted at a temperature of about 30° to about 200° C. For example, seven mols of propylene oxide will add to the Mannich product prepared from a molar ratio of 1:3:3 of phenol, diethanolamine and formaldehyde to give a heptol having the theoretical structural formula set forth below:

herein defined for the purpose of this application as an "alkylene oxide adduct of the Mannich reaction product of a phenolic compound with formaldehyde and an alkanolamine."

It is, of course, possible to add less than one mol of alkylene oxide per free phenolic and primary hydroxyl group in the Mannich condensation product. The minimum desirable amount of alkylene oxide is one mol per free amino hydrogen atom and phenolic hydroxyl group. In general, phenolic hydroxyl groups form unstable urethane linkages and so are to be avoided where practical. Since phenolic hydroxyl groups are more reactive than alcoholic hydroxyl groups, the phenolic hydroxyl groups will react with the alkylene oxide first, thereby assuring reaction of the phenolic hydroxyl groups when less than the stoichiometric amount of alkylene oxide is used. Generally, more than the minimum amount of alkylene oxide is used to obtain a product having a lower hydroxyl number and lower viscosity. For example, a desirable product is that obtained by the addition of five mols of propylene oxide (rather than the maximum of seven or minimum of one) to the heptol obtained by the Mannich condensation of phenol, formaldehyde and diethanolamine n a molar rato of 1:3:3.

Examples of alkylene oxides that can be used include ethylene oxide, propylene oxide, butylene oxide, styrene oxide, glycidol, and heteric or blocked mixtures thereof. The alkylene oxide of choice of the present invention is propylene oxide.

The following examples will further illustrate the preparation of the polyols of the present invention. These examples are given by way of illustration and not as limitations on the scope of this invention.

EXAMPLE I

Phenol (4.14 lbs., 20 mols), diethanolamine (13.9 lbs., 60 mols) and water (1.77 lbs.) were charged into a five-gallon kettle. Formaldehyde (as 37% formalin solution, 10.7 lbs., 60 mols) was slowly added to the kettle with agitation, while maintaining the reaction temperature at about 25° C. After the addition was complete, the reaction mixture was stirred for one hour at 35° C. and then heated for one hour at 83° C. Water was then stripped from the reaction mixture at about 90° C. for about 5.5 hours employing a nitrogen bleed at 300 mm. of pressure. Thereafter, propylene oxide (19.2 lbs., 150 mols) was added at a temperature of about 90° to 120° C. over a period of about four hours. After the reaction had ceased, unreacted propylene oxide was stripped from the reaction mixture. A Mannich polyol was thus prepared having a hydroxyl number of about 495.

EXAMPLE II

About 4.19 lbs. (20.2 mols) of phenol and about 13.9 lbs. (60.0 mols) of diethanolamine were added to a reaction kettle, and thereafter 10.7 lbs. (60.0 mols) of formalin was added with agitation while maintaining the reaction temperature at about 35° C. After the addition of the formaldehyde, the reaction mixture was stirred for

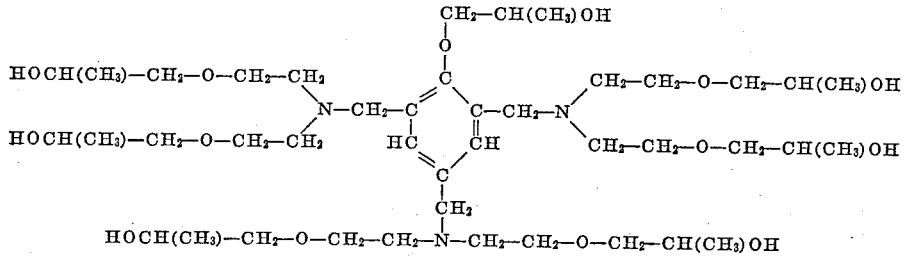

Although the above-shown compound may be the dominant component of the reaction mixture, the mixture actually contains some quantities of triols, pentols and heptols having varying degrees of propoxylation. Since the new polyol of the present invention is a complex mixture, it is about one hour at 30° C. and then heated at about 90° C. to 95° C. for 2.5 hours. Water was then stripped from the reaction mixture by heating at 95° C. and a pressure of less than 1 mm. The resulting intermediate Mannich base was heated to about 95° C., and propylene oxide was added. After about 3 lbs. of propylene oxide had been added, the temperature was increased to about 120° C., and the addition of oxide continued until no pressure drop occurred. A total of about 13.3 lbs. (104 mols) of propylene oxide was added, of which about 0.64 lb. was unreacted and removed by vacuum stripping. The product was an amber colored, viscous liquid with a hydroxyl number of 570 and a viscosity of 37,650 cps. at 25° C.

EXAMPLE III

A three-liter flask was charged with 564 grams (6 mols) of phenol and 1,260 grams (12 mols) of diethanolamine. To this mixture was added with agitation 974 grams (12 mols) of a 37% formaldehyde solution, while maintaining a temperature of about 25° C. After formaldehyde addition, the reaction mixture was agitated overnight at room temperature and then heated to 90° C. for about two to five hours. Water was then removed from the product by vacuum stripping at 100° C. and 0.25 mm. pressure, leaving 1,971 grams of a light yellow, viscous oil. Of this material, 1,772 grams (5.41 mols) was heated to 90° C. in an autoclave, and 1,378 grams (21.7 mols) of propylene oxide was added. After addition was complete, the reaction mixture was digested at 90° C. for about one hour, then vacuum stripped, yielding 3,053 grams of a golden colored, viscous material having a hydroxyl number of 508 and a viscosity at 25° C. of 45,000 cps.

EXAMPLE IV

Example I was repeated except that the heating period after the formaldehyde addition was carried out at 90° C. for five hours. As a result the free formaldehyde content of the Mannich base was lowered from about 0.6% to about 0.12%.

EXAMPLE V

A three-liter flask was charged with 498 grams (3.88 mols) of practical grade p-chlorophenol and 794 grams (7.36 mols) of diethanolamine. A solution of 37% formaldehyde (597 grams, 7.36 mols) was added with agitation, maintaining a temperature below 35° C. The mixture was agitated at room temperature for one hour, then heated at 90° to 110° C. for a total of six hours. The mixture was vacuum stripped at 110° C. and less than 1 mm. pressure to remove the water, leaving 1,383 grams of product. Propylene oxide was added to a portion of this material at 120° C. until no further pressure drop occurred. The propoxylated product was vacuum stripped at 120° C. and 0.5 mm. pressure to yield a polyol having a hydroxyl number of 508.

EXAMPLE VI

A three-liter flask was charged with 941 grams (10.0 mols) of phenol and 1,051 grams (10.0 mols) of diethanolamine. This mixture was cooled by means of an ice bath to 16° C., and 1,204 grams (15.0 mols) of 37% formaldehyde solution was added with stirring between 16° and 25° C. The mixture was stirred for one hour at 30° C., then heated to 95° C. for five hours. The reaction mixture was then heated at 95° to 100° C. under vacuum for a total of nine hours. The final product was then stripped at a pressure of less than 1 mm., yielding 2,173 grams of a very viscous material. This product (2,100 grams) was reacted with 1,314 grams of propylene oxide at 110° C. and 60 p.s.i.g. until no pressure drop occurred. The propylene oxide adduct was vacuum stripped at 100° C. and less than 1 mm. pressure to yield a polyol having a hydroxyl number of 533.

EXAMPLE VII

A five-gallon kettle was charged with 9.41 lbs. (0.1 lb. mol) of phenol and 10.51 lbs. (0.1 lb. mol) of diethanolamine. The mixture was maintained at a temperature of 35° C. under a nitrogen atmosphere while 8.04 lbs. (0.1 lb. mol) of a 37% formaldehyde solution was added slowly with agitation. After the formaldehyde addition the mixture was stirred at room temperature for one hour, then heated to 95° C. for an additional two hours. The reaction mixture was then purged with gas at 95° C. and 3 mm. pressure. To the resulting Mannich base was added 11.6 lbs. (0.2 lb. mol) of propylene oxide at 95° C., followed by digestion of the mixture at 110° C. for 0.5 hour. The reaction mixture was then vacuum stripped to yield a light amber colored, viscous liquid having a hydroxyl number of 531 and viscosity of 30,000 cps. at 25° C.

EXAMPLE VIII

A five-gallon kettle was charged with 8.00 lbs. (38.5 mols) of phenol and 17.87 lbs. (77.1 mols) of diethanolamine. The kettle was evacuated and purged with nitrogen prior to the addition of 13.64 lbs. (77.1 mols) of 37% formaldehyde solution which was added with agitation while the reaction temperature was not allowed to rise above 35° C. After completion of the formaldehyde addition the mixture was stirred at 35° C. for one hour, then heated at 90° for four hours. The Mannich base was stripped under vacuum with a nitrogen purge at 90° C. Propylene oxide (18.44 lbs., 144.3 mols) was then added at 90° to 110° C. and 60 p.s.i.g. The propoxylated product was stripped to yield 42.57 lbs. of a polyol having a hydroxyl number of 561 and a viscosity of 38,800 cps. at 25° C.

As hereinbefore stated, the polyols of the present invention offer many advantages in the preparation of rigid polyurethane foams. Although a polyurethane foam may be prepared from a polyol component consisting entirely of a polyol of the present invention, it may be desirable to employ a polyol component containing from about 30 to about 100 wt. percent of a polyol of the present invention and, correspondingly, from about 90 to 0 wt. percent of a second polyol normally used to prepare rigid urethane foams, and having a hydroxyl number of from about 350 to about 900. Many examples of such polyols are known to those skilled in the art and may include those prepared by the reaction of an alkylene oxide selected from the group consisting of ethylene oxide, propylene oxide, 1,2-butylene oxide, styrene oxide, epichlorohydrin, glycidol and mixtures thereof with a polyhydric compound selected from the group consisting of carbohydrates and aliphatic and aromatic compounds containing from about three to about eight hydroxyl groups, such as hexanetriol, pentaerythritol, sorbitol, methyl glucoside, sucrose, 1,3,3-tris(hydroxypropoxyphenyl)propane, etc. In addition, alkylene oxide adducts of certain amines such as, for example, propylene oxide adducts of ethylene diamine, aminoethylpiperazine, etc., may be used. Certain hydroxy-terminated polyesters are also used to prepare rigid urethane foams. These are usually prepared from dibasic acids such as phthalic and adipic acids and diols or triols such as, for example, diethylene glycol, glycerine, trimethylolpropane, etc.

In preparing foams from the instant polyols, conventional foam preparation procedures are used with the exception that a catalyst is not needed. Polyisocyanates, blowing agents, foam stabilizers and fire-retardants useful in the preparation of rigid polyurethane foams are well known to those skilled in the art. Such components are described, for example, by Frisch et al. in an article entitled "Advances in Technology and Uses of Rigid Urethane Foams" (Modern Plastics 40, 165 (October, 1962)).

In the quasi-prepolymer process, the quasi-prepolymer is prepared by the reaction of a large molar excess of a polyisocyanate with a polyol. This quasi-prepolymer is then further reacted with additional polyol and other foam components at the time of foaming. In the one-shot process, the foam components are mixed all at once.

If the quasi-prepolymer method is used to prepare rigid urethane foam in accordance with present invention, it is preferred that the quasi-prepolymer be prepared by reacting a second polyol of the type above described with an amount of polyisocyanate sufficient to provide from about 20 to 40 wt. percent of free isocyanato groups (based on the total amount of polyisocyanate used) in the quasi-prepolymer reaction product. An amount of the polyol of the present invention sufficient to provide about one hydroxyl group per free isocyanato group in the quasi-prepolymer is then added to the quasi-prepolymer in the presence of a foam stabilizer, a blowing agent and in some cases a fire retardant.

The most commonly used foam stabilizers are silicone oils, usually silicone-glycol copolymers such as those prepared in accordance with the disclosure of U.S. Patent No. 2,834,748. Such materials have the formula:

$$R'Si[O-(R_2SiO)_n-(oxyalkylene)_mR'']_3$$

wherein R, R' and R'' are alkyl groups containing 1-4 carbon atoms, $n$ is 4-8, $m$ is 20-40, and the oxyalkylene groups are derived from ethylene and propylene oxides or mixtures thereof. Blowing agents used to prepare urethane foams are described in U.S. Patent 3,072,582. Blowing agents are generally volatile liquids such as, for example, trichlorofluoromethane and methylene chloride. Fire retardants that can be incorporated in the foaming mixture are of two types—those that are incorporated by mere mechanical mixing and those that become chemically bound in the polymer chain. The most commonly used of the first type are tris(chloroethyl) phosphate, tris(2,3-dibromopropyl) phosphate, diammonium phosphate, various halogenated compounds and antimony oxide. The second type fire retardant probably offers the best approach to the problem of fire retarding foams. Examples of this type fire retardant include chlorendic acid derivatives and various phosphorus-containing polyols.

Although the presence of a tertiary amine catalyst such as triethylenediamine, triethylamine, dimethylpiperazine, etc., is normally required to prepare an acceptable polyurethane foam, it is an advantage of the present invention that such an amine catalyst is not necessary. If a faster rise time or tack-free time is desired, a tertiary amine catalyst may be added.

The organic polyisocyanate is suitably an organic aromatic or aliphatic polyisocyanate such as 3,3'-dichloro-4,4'-biphenyl diisocyanate, diphenyl diisocyanate, ethylene diisocyanate, propylene-1,2-diisocyanate, 1,4-tetramethylene diisocyanate, p-phenylene diisocyanate, 2,4- and 2,6-toluene diisocyanates, o,o'-, o,p'- and p,p'-diphenylmethane diisocyanates, hexamethylene diisocyanate, polymethylene polyphenylisocyanate, and mixtures thereof.

The following examples will serve to further illustrate the preparation of rigid polyurethane foams from the polyols of the present invention by use of the quasi-prepolymer technique. These examples are in no way intended to place limitations on the scope of this invention.

EXAMPLE IX

Rigid polyurethane foams were prepared from the Mannich polyol of Example I employing the formulations set forth in Table I. The quasi-prepolymer used contained 27.6% free isocyanato groups and was prepared from toluene diisocyanate and a propylene oxide adduct of sorbitol having an average molecular weight of about 700. All of the components in the formulations except the quasi-prepolymer were premixed and weighed into an aluminum syringe. The quasi-prepolymer was weighed into a tall wax-lined cup. The polyether component was then quickly injected into the prepolymer and stirred for eight seconds at 4,200 r.p.m. The foaming mixture was poured into a 6" x 6" x 12" open mold and allowed to rise. The foams were oven cured for two hours at 70° C. and allowed to stand at room temperature for 72 hours before testing. Properties of the foams are shown in Table 1.

Table 1

| Formulations, parts by weight | A | B | C |
|---|---|---|---|
| Quasi-prepolymer | 200 | 200 | 200 |
| Polyol of Example I | 140 | 140 | 140 |
| Blowing agent [1] | 55 | 58 | 60 |
| Foam stabilizer [2] | 2.0 | 2.0 | 2.0 |
| Fire retardant [3] | 0 | 18 | 38 |
| NCO/OH ratio | 1.05 | 1.05 | 1.05 |
| Foam properties: | | | |
| Cream time, sec | 25 | 25 | 25 |
| Rise time, sec | 105 | 105 | 105 |
| Density, lb./ft.$^3$ | 1.87 | 1.90 | 2.00 |
| Heat distortion temp., ° C | 112 | 112 | 104 |
| Compressive strength, lb./in.$^2$ | 33.8 | 30.9 | 31.8 |
| Tensile strength, lb./in.$^2$ | 52.4 | 52.4 | 52.8 |
| Burning rate, in./min.[4] | 6.7 | SE | SE |
| K-factor, initial | 0.107 | 0.110 | 0.114 |
| Dimensional stability: | | | |
| 0° F., dry, 1 week: | | | |
| Percent volume change | −0.5 | −1.5 | −0.7 |
| Percent weight change | −1.1 | −0.5 | −0.5 |
| 180° F., dry, 1 week: | | | |
| Percent volume change | +6.9 | +4.5 | +10.5 |
| Percent weight change | −1.5 | −0.2 | −0.6 |
| 158° F., 100% R.H.: | | | |
| Percent volume change | +20.3 | −1.6 | −1.4 |
| Percent weight change | −6.5 | −8.3 | −6.1 |

[1] Trichlorofluoromethane.
[2] Silicone oil of the type described hereinabove.
[3] Tris(2,3-dibromopropyl) phosphate.
[4] Burning rate test, ASTM 1692-59T.

It will be observed from Table 1 that rapid cream and rise times were obtained in all three formulations although no extraneous catalyst was used. The foams also exhibited excellent compressive and tensile strength, with no loss in strength upon the addition of extraneous fire-retarders. The addition of 5% (based on all foam components except blowing agent) fire retarder in formulation B resulted in a self-extinguishing foam while the addition of 10% fire-retarder in formulation C also gave a self-extinguishing foam.

EXAMPLE X

A rigid polyurethane foam was prepared from the Mannich polyol of Example II. The formulation employed and the results obtained are set forth in Table 2. The quasi-prepolymer employed was again prepared from toluene diisocyanate and a propylene oxide adduct of sorbitol with a molecular weight of about 700. The blowing agent, foam stabilizer and fire retardant were the same as those employed in Example IX, and the foam preparation was conducted in a manner similar to Example IX.

Table 2

Formulation, parts by weight:
    Quasi-prepolymer _____ 200
    Polyol of Example II _____ 123
    Blowing agent _____ 45
    Foam stabilizer _____ 3.0
    Fire retardant _____ 17.5
Properties:
    Rise time, sec. _____ 110
    Density, lb./ft.$^3$ _____ 2.19
    Compressive strength, lb./in.$^2$ _____ 40.4
    Heat distortion point, ° C. _____ 132
    Burning rate, in./min.
        ASTM 1692-59T _____ nonburning

EXAMPLE XI

A series of rigid polyurethane foams were prepared from the Mannich polyol of Example II. The formulations employed and the results obtained are set forth in Table 3. Once again, the quasi-prepolymer, fire-retardant, foam stabilizer and blowing agent were the same as those used in earlier examples, and the method of foam preparation was similar to Example IX.

Table 3

| Formulation, parts by weight | 1 | 2 | 3 | 4 | 5 | 6 | 7 |
| --- | --- | --- | --- | --- | --- | --- | --- |
| Polyol of Example II | 142 | 127 | 127 | 152 | 127 | 127 | 127 |
| Quasi-prepolymer | 224 | 200 | 200 | 240 | 200 | 200 | 200 |
| Fire retardant | 0 | 0 | 17.0 | 20.5 | 17.0 | 36.7 | 36.7 |
| Foam stabilizer | 2.8 | 2.0 | 2.0 | 2.4 | 2.0 | 2.0 | 3.0 |
| Blowing agent | 56 | 50 | 53 | 64 | 53 | 56 | 56 |
| Properties: | | | | | | | |
| Cream time, sec | 10 | 16 | 10 | 10 | 15 | 10 | 10 |
| Rise time, sec | 90 | 70 | 98 | 90 | 85 | 98 | 103 |
| Tack-free time, sec | 90 | 70 | 98 | 90 | 85 | 98 | 103 |
| Density, lb./ft.$^3$ | 1.9 | 2.01 | 2.14 | 1.93 | 1.96 | 2.02 | 2.00 |
| Heat distortion point, ° C | 140 | 134 | 134 | 130 | 130 | 134 | |
| Compressive strength, lb./in.$^2$ | 40.6 | 44.2 | 38.9 | 37.8 | 41 | 36.9 | |
| Tensile strength, lb./in.$^2$ | | 67.4 | 63.9 | | 63.1 | 61.7 | 70.5 |
| Burning rate, in./sec., ASTM 1692-59T | 4/30 | | SE | SE | SE | NB | NB |
| Dimensional stability: | | | | | | | |
| 0° F., no humidity control | −2.4 | −1.3 | −1.9 | −2.2 | −0.8 | −1.7 | |
| 180° F., no humidity control | +0.9 | +0.9 | +2.0 | +1.1 | +0.3 | +0.7 | |
| 158° F., 100% relative humidity | −8.4 | +13.8 | +19.2 | +15.2 | +21.4 | +18.2 | |
| K-factor, initial at 75′ F | | 0.102 | | | 0.104 | | |

From Table 3, it will be seen that, in the absence of a fire retardant, rigid polyurethane foams were prepared which had improved properties with respect to the foams prepared from the Mannich polyol of Example I. In particular, there was a significant improvement in dimensional strength, heat distortion temperature and compressive strength.

With the addition of 5 wt. percent of fire retardant, improved results were again obtained in that physical properties and dimensional stability were not adversely affected, yet a self-extinguishing foam was obtained. Finally, foams containing 10 wt. percent of fire retardant were nonburning in contrast to foams prepared from the polyol of Example I with a similar amount of fire retardant. The use of this large amount of fire retardant did not adversely affect the final properties of the foam.

It is a further advantage of this invention that in addition to the quasi-prepolymer procedure normally used in rigid urethane foam production the one-shot technique may also be used when polyols of the present invention are employed. In the one-shot technique there is no prereaction of the polyisocyanate and polyol as there is in the preparation of a prepolymer. The entire reaction takes place in one step. If the more reactive isocyanates such as toluene diisocyanate or hexamethylene diisocyanate are employed, it is preferable to reduce the catalytic activity of the polyols of the present invention by using a mixture of a Mannich polyol with one or more of the second polyols described hereinabove which do not have catalytic activity. However, when the less reactive isocyanates such as polymethylene polyphenylisocyanate and o,o′-diphenylmethane diisocyanate are used, the polyols of the present invention may be used alone since it is not necessary to reduce the catalytic activity.

As with the use of the prepolymer technique, extraneous catalysts are not needed to prepare foams from the instant polyols by the one-shot method. The blowing agents, foam stabilizers and fire retarders used in the one-shot method are the same as those used in the prepolymer method and discussed hereinabove.

The following examples will illustrate the use of polyols of the present invention to prepare rigid polyurethane foams employing the one-shot technique.

EXAMPLE XII

Rigid polyurethane foams were prepared from the Mannich polyols of Examples VII and VIII by the use of the one-shot technique. The formulations employed and the results obtained are set forth in Table 4. All of the ingredients except the isocyanate were mixed together and then added to the isocyanate. The final mixture was stirred at 4,200 r.p.m. for 10 seconds and then poured into a 6″ x 6″ x 12″ open mold. The foams were oven cured for one hour at 70° C. The blowing agent, foam stabilizer and fire retardant were the same as those used in Example IX.

Table 4

| Formulation, parts by weight | A | B | C |
| --- | --- | --- | --- |
| Polymethylene polyphenylisocyanate | 214 | 214 | 143 |
| Polyol of Example VII | 157 | 157 | |
| Polyol of Example VIII | | | 100 |
| Blowing agent | 56 | 56 | 50 |
| Foam stabilizer | 7 | 7 | 7 |
| Fire retardant | | 20 | |
| Properties: | | | |
| Rise time, sec | 83 | 100 | 81 |
| Density, lb./ft.$^3$ | 1.97 | 2.18 | 1.73 |
| Compressive strength, lb./in.$^2$ | 40.2 | 42.8 | 14.1 |
| Tensile strength, lb./in.$^2$ | 56.9 | 62.1 | 35.6 |
| Burning rate, ASTM 1692-59T | ($^1$) | ($^1$) | |

$^1$ Nonburning.

It can be seen from Table 4 that rigid polyurethane foams with good properties can be prepared from the instant polyols by the one-shot method. All the formulations gave rapid rise times and foams A and B have excellent dimensional strength. The addition of an extraneous fire retardant to formulation B did not adversely affect the foam properties. Both foams A and B were nonburning.

The preferred polyols of the present invention for use in preparing rigid polyurethane foams by the prepolymer or one-shot techniques are those obtained by the addition of propylene oxide to the Mannich condensates of one mol of phenol with one mol each of formaldehyde and diethanolamine and one mol of nonylphenol with two mols each of formaldehyde and diethanolamine.

We have also discovered that the polyols of our invention are particularly well suited for use in the preparation of rigid polyurethane foams by the spraying technique. In addition to the properties normally desired in a rigid foam, for spray applications the formulation must be sufficiently reactive that the foaming mass sets to rigidity quickly in order to prevent sagging. The present polyols have this desired reactivity. The foams so obtained are truly remarkable in flame retardancy, strength and dimensional stability. Further, these polyols are ideally suited to one-shot spray formulations due to their excellent compatibility with crude isocyanates.

The techniques of spraying rigid polyurethane foam are well known to those skilled in the art. Briefly, the components of the formulation are fed into the mixing chamber of the sprayer where they are thoroughly mixed and immediately ejected. Basically, the formulation comprises a polyisocyanate and a polyol. To these ingredients are added one or more minor components selected from the group consisting of a foam stabilizer, a catalyst, a blowing agent and a fire retardant.

While the Mannich condensate itself may be used as the polyol for the preparation of sprayed rigid polyurethane foams, the preferred polyols are obtained by the addition of an alkylene oxide to the condensate. However, it is to be understood that it is not necessary to add an alkylene oxide to the Mannich condensate to obtain a suitable polyol for preparing sprayed rigid foams. A particularly preferred polyol of the present invention for use in preparing sprayed rigid foams is a triol having a hydroxyl number of from about 490 to about 550 and obtained by the propoxylation of the Mannich condensation product of one mol of phenol, one mol of diethanolamine and one mol of formaldehyde.

Polyisocyanates that may be used in preparing sprayed foams are those described hereinabove. The preferred polyisocyanate for use in preparing sprayed foams is a polymethylene poly(4-phenylisocyanate). The isocyanate may also be in the form of a prepolymer prepared by the reaction of an excess of a polyisocanate with a polyol, all in accordance with known techniques. The polyol employed in preparing the prepolymer may be a hydroxy-terminated polyester or polyether.

Preferably, a nitrogen-containing polyol as described herein is employed as the sole polyol component in accordance with the present invention. However, improved sprayed rigid polyurethane foams can be obtained when the polyol component contains as little as 10 wt. percent of a nitrogen-containing polyol as described herein, with the remainder being a second polyol normally used to prepare rigid polyurethane foams as described hereinabove.

In order to obtain a sag-free sprayed rigid foam when using a polyol of the present invention, the use of an amine catalyst is not required. However, it is preferred that an organo-metallic catalyst be used. Preferred organo-metallic catalysts are organo-tin compounds such as described, for example, in United States Patents 3,075,927 and 3,084,177. A particularly preferred catalyst is dibutyltin dilaurate.

In a preferred spraying procedure, a two-component system is employed. The A component comprises the polyisocyanate, while the B component comprises the remainder of the ingredients—the polyol, the blowing agent, the foam stabilizer and the catalyst. In the past, storage stability of the B component has been a serious problem. B components containing a nitrogen-containing polyol of the present invention have shown excellent retention of the catalyst activity. The fact that no added amine catalyst is required in the formulation results in better storage stability when halogenated flame retardants are used.

To prepare the foam, the A and B component streams are pumped to an internally mixed spray gun fitted with an air atomization nozzle. The mixture is sprayed through the nozzle onto the surface to be coated where foaming and setting occur.

EXAMPLE XIII

Sprayed rigid polyurethane foams were prepared from three nitrogen-containing polyols of the present invention in accordance with the above-described procedure. These three polyols were a Mannich pentol condensate prepared by reacting one mol of nonylphenol with two mols of diethanolamine and two mols of formaldehyde (hereinafter referred to as Polyol 1), a Mannich pentol prepared by propoxylation of Polyol 1 to a hydroxyl number of 453 (hereinafter referred to as Polyol 2) and a Mannich triol prepared by propoxylation of the Mannich condensate formed by the reaction of one mol of phenol with one mol of diethanolamine and one mol of formaldehyde to a hydroxyl number of 530 (hereinafter referred to as Polyol 3). These polyols analyzed as follows:

| Property | Polyol 1 | Polyol 2 | Polyol 3 |
| --- | --- | --- | --- |
| Hydroxyl No., mg. KOH/g | 678 | 453 | 530 |
| Viscosity, 25° C., cps | | 20,550 | 27,900 |
| Viscosity, 100° C., cps | 163 | | |
| Total amine, meq./g | 3.79 | 3.05 | 2.72 |
| Water, wt. percent | 0.17 | 0.01 | 0.05 |

The foam formulations employed and the properties of the foams obtained are shown in the following table.

The mixed components were sprayed onto a vertical surface at a rate sufficient to yield about two inches of foam per pass. The foams were allowed to cure at room temperature 72 hours before testing. The blowing agent and foam stabilizer were the same as those used in Example IX.

Table 5

| Foam formulations, pbw. | Polyol 1 | Polyol 2 | Polyol 3 |
| --- | --- | --- | --- |
| A component: | | | |
| Mondur MR [1] | | | 131.0 |
| PAPI [2] | 171.0 | 110.0 | |
| B component: | | | |
| Polyol | 100.0 | 100.0 | 100.0 |
| Blowing agent | 50.0 | 32.0 | 40.0 |
| Foam stabilizer | 1.7 | 1.1 | 1.3 |
| Dibutyltin dilaurate | 0.17 | 0.28 | 0.3 |
| Foam properties: | | | |
| Core density, lb./cu. ft | 1.80 | 2.13 | 1.82 |
| Compressive strength, p.s.i | 27.0 | 36.0 | 30.0 |
| Heat distortion temp., °C | 175 | 154 | 165 |
| Percent closed cells | 96.2 | 96.0 | 95.0 |
| K-factor, 1 week | 0.121 | 0.122 | 0.147 |
| Burning rate, in./min.[3] | N.B. | S.E. | S.E. |
| | 1.3 | 2.3 | 2.3 |
| Dimensional stability: | | | |
| 158° F., 100 R.H.: | | | |
| Percent volume change: | | | |
| 12 hours | +3.7 | +1.0 | +1.5 |
| 24 hours | +4.7 | +1.5 | +2.8 |
| 1 week | +6.8 | +3.4 | +4.5 |
| Percent weight change: | | | |
| 12 hours | 0.0 | −0.7 | −1.3 |
| 24 hours | −0.5 | −0.9 | −0.5 |
| 1 week | −1.8 | −0.9 | −1.3 |
| 180° F., dry, 1 week: | | | |
| Percent volume change | +3.4 | +1.2 | +2.2 |
| Percent weight change | −0.3 | −1.8 | −1.3 |
| 0° F., dry, 1 week: | | | |
| Percent volume change | −7.0 | −2.0 | −2.5 |
| Percent weight change | +0.5 | 0.0 | 0.0 |

[1] A crude p,p'-diphenylmethane diisocyanate containing sufficient polymeric material so that the average functionality is about 2.5.
[2] Polymethylene poly(4-phenylisocyanate).
[3] Test method ASTM 1692-59T.

It can be seen that excellent foams were obtained from these formulations. Particularly outstanding were the burning characteristics of the foams. The foam obtained from Polyol 1 was non-burning, while the other two foams were self-extinguishing without the addition of a fire retardant. To demonstrate further this remarkable property, three additional foams were prepared from Polyol 3 with the incorporation in the formulation of 4.75 wt. percent of a fire retardant (o,o-diethyl-N,N-bis(2-hydroxyethyl)aminoethyl phosphate). The fire retardant was included in the B component. All of these foams were classified as non-burning when tested according to ASTM 1692-59T.

Having thus described our invention, we claim:

1. A method for preparing a rigid polyurethane foam which comprises reacting an organic polyisocyanate with a polyol component comprising from about 30 to 100 wt. percent of a nitrogen-containing polyol having a hydroxyl number of from about 250 to about 900 and a nitrogen content of from about 1 to about 15 wt. percent and, correspondingly, from about 70 to 0 wt. percent of a second polyol, said nitrogen-containing polyol having been prepared by a method which comprises the steps of:

(1) mixing a phenol and an alkanolamine selected from the group consisting of alkanolamines having the formulae:

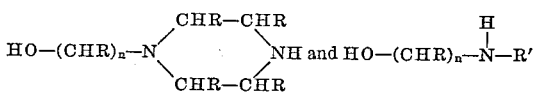

wherein R is selected from the group consisting of hydrogen and $C_1$–$C_4$ alkyl, R' is selected from the group consisting of hydrogen, $C_1$–$C_4$ alkyl and —(CHR)$_n$—OH and $n$ is a positive integer having a value of two to five;

(2) thereafter adding formaldehyde to the mixture at a temperature below the temperature of Novolak formation;

(3) heating the resulting mixture at a temperature within the range of from about 50° to 150° C. for a period of time sufficient to reduce the formaldehyde content to no more than about 1%;
(4) stripping the water from the reaction product; and
(5) adding on alkylene oxide selected from the group consisting of ethylene oxide, propylene oxide, butylene oxide, styrene oxide, glycidol and mixtures thereof to said stripped reaction product at a temperature within the range of about 30° to about 200° C.

2. A product prepared by the method of claim 1.

3. A method as in claim 1 wherein the nitrogen-containing polyol is obtained by the addition of propylene oxide to the Mannich condensation product of one mol of phenol, one mol of diethanolamine and one mol of formaldehyde.

4. A method as in claim 1 wherein the nitrogen-containing polyol is obtained by the addition of propylene oxide to the Mannich condensation product of one mol of nonylphenol, two mols of diethanlamine and two mols of formaldehyde.

5. A method as in claim 1 wherein a foam stabilizer and a blowing agent are included in the formulation.

6. A method as in claim 5 wherein a fire retardant is included in the formulation.

7. A method as in claim 5 wherein the organic polyisocyanate is employed in the form of a quasi-prepolymer containing from about 20% to about 40% free isocyanato groups and having been prepared from said organic polyisocyanate and a second polyol having a hydroxyl number within the range of from about 350 to about 900.

8. A method as in claim 7 wherein a fire retardant is included in the formulation.

9. A method as in claim 5 wherein there is no pre-reaction of the organic polyisocyanate and polyol.

10. A method as in claim 9 wherein a fire retardant is included in the formulation.

11. In a method for preparing a sprayed rigid polyurethane foam by the reaction of an organic polyisocyanate with a polyol component, the improvement wherein the polyol component comprises from about 10 to 100 wt. percent of a nitrogen-containing polyol having a hydroxyl number of from about 250 to about 900 and a nitrogen content of from about 1 to about 15 wt. percent and, correspondingly, from about 90 to 0 wt. percent of a second polyol, said nitrogen-containing polyol having been prepared by a method which comprises:
(1) mixing a phenol and an alkanolamine selected from the group consisting of alkanolamines having the formulae:

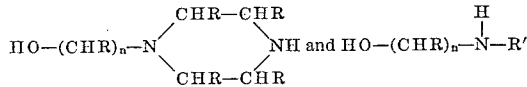

wherein R is selected from the group consisting of hydrogen and $C_1$–$C_4$ alkyl, R' is selected from the group consisting of hydrogen, $C_1$–$C_4$ alkyl and —$(CHR)_n$—OH and $n$ is a positive integer having a value of two to five;
(2) thereafter adding formaldehyde to the mixture at a temperature below the temperature of Novolak formation;
(3) heating the resulting mixture at a temperature within the range of from about 50° to about 150° C. for a period of time sufficient to reduce the formaldehyde content to no more than about 1%;
(4) stripping the water from the reaction product; and
(5) adding an alkylene oxide selected from the group consisting of ethylene oxide, propylene oxide, butylene oxide, styrene oxide, glycidol and mixtures thereof to said stripped reaction product at a temperature within the range of from about 30° to 200° C.

12. A method as in claim 11 wherein the nitrogen-containing polyol is a triol having a hydroxyl number of from about 490 to 550 and obtained by the propoxylation of the Mannich condensation product of one mol of phenol, one mol of diethanolamine and one mol of formaldehyde.

13. A method as in claim 11 wherein a blowing agent, a foam stabilizer and an organo-metallic catalyst are included in the formulation.

14. A method as in claim 13 wherein a fire retardant is included in the formulation.

References Cited by the Examiner

UNITED STATES PATENTS

| Re. 24,514 | 8/1958 | Hoppe | 260—2.5 |
| 2,953,533 | 9/1960 | Khawam | 260—2.5 |
| 2,956,031 | 10/1960 | Khawam | 260—2.5 |
| 3,075,927 | 1/1963 | Lanham | 260—2.5 |
| 3,222,305 | 12/1965 | Lanham | 260—2.5 |

FOREIGN PATENTS 972,772  10/1964  Great Britain.

OTHER REFERENCES

Belgium Derwert Abstracts; vol. 80B; November 10, 1961; delayed section, page C–11 (see Belgian Patent Number 600,112).

JEON J. BERCOVITZ, *Primary Examiner.*

F. McKELVEY, *Assistant Examiner.*